Figure 1:
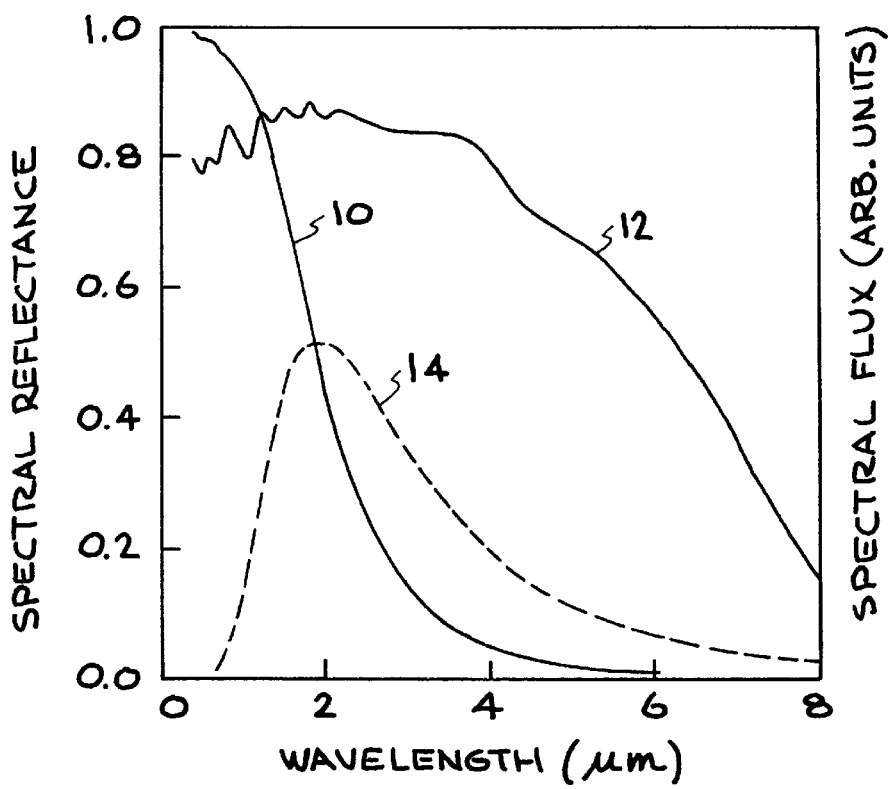

United States Patent [19]
Berdahl

[11] Patent Number: 5,811,180
[45] Date of Patent: Sep. 22, 1998

[54] PIGMENTS WHICH REFLECT INFRARED RADIATION FROM FIRE

[75] Inventor: Paul H. Berdahl, Oakland, Calif.

[73] Assignee: The Regents of the University of California, Oakland, Calif.

[21] Appl. No.: 622,981

[22] Filed: Mar. 27, 1996

Related U.S. Application Data

[63] Continuation of Ser. No. 280,270, Jul. 26, 1994, abandoned.

[51] Int. Cl.$^6$ ........................................... B32B 5/16
[52] U.S. Cl. .......................... 428/324; 428/329; 428/402; 428/921
[58] Field of Search ..................................... 428/283, 324, 428/329, 402, 921

[56] References Cited

U.S. PATENT DOCUMENTS

| | | | |
|---|---|---|---|
| 3,717,509 | 2/1973 | Palm et al. ................................ | 148/6.2 |
| 3,955,987 | 5/1976 | Schaar et al. ......................... | 106/156 P |
| 4,495,239 | 1/1985 | Pusch et al. ............................. | 428/192 |
| 4,560,608 | 12/1985 | Pusch et al. ............................. | 428/196 |
| 4,598,015 | 7/1986 | Panush ..................................... | 428/324 |
| 5,130,184 | 7/1992 | Ellis ........................................ | 428/245 |
| 5,312,678 | 5/1994 | McCullough, Jr. ..................... | 428/225 |
| 5,348,789 | 9/1994 | Hellwig ................................... | 428/135 |
| 5,366,763 | 11/1994 | McDaniel ................................ | 427/193 |

*Primary Examiner*—Helen L. Pezzuto
*Attorney, Agent, or Firm*—Paul Martin

[57] ABSTRACT

Conventional paints transmit or absorb most of the intense infrared (IR) radiation emitted by fire, causing them to contribute to the spread of fire. The present invention comprises a fire retardant paint additive that reflects the thermal IR radiation emitted by fire in the 1 to 20 micrometer ($\mu$m) wavelength range. The important spectral ranges for fire control are typically about 1 to about 8 $\mu$m or, for cool smoky fires, about 2 $\mu$m to about 16 $\mu$m. The improved inventive coatings reflect adverse electromagnetic energy and slow the spread of fire. Specific IR reflective pigments include titanium dioxide (rutile) and red iron oxide pigments with diameters of about 1 $\mu$m to about 2 $\mu$m and thin leafing aluminum flake pigments.

6 Claims, 2 Drawing Sheets

PIGMENTS WHICH REFLECT INFRARED RADIATION FROM FIRE

This application is a continuation of application Ser. No. 08/280,270 filed on Jul. 26, 1994, now abandoned.

This invention was made with U.S. Government support under Contract No. DE-AC03-76SF00098 between the U.S. Department of Energy and the University of California for the operation of Lawrence Berkeley Laboratory. The U.S. Government may have certain rights in this invention.

I. BACKGROUND OF THE INVENTION

1. Field of the Invention

This invention relates generally to paints and coatings capable of retarding the spread of fire. More particularly, the present invention relates to fire-resistant coatings.

2. Description of Related Art

Fire-resistant paints have in the past been formulated either to reflect heat or to insulate from heat and thus keep the temperature of a coated combustible substrate below the ignition temperature. A thorough summary of existing fire retardant coatings and the methods by which they work can be found in R. I. Ensminger's contribution, found on page 123 of *Pigment Handbook*, Volume II, edited by Temple C. Patton, John Wiley & Sons, 1988.

There are two basic approaches to fire retardant coatings: 1) coatings that do not burn when exposed to fire, generally referred to as "fire-resistant" and 2) coatings that insulate the flammable substrate, keeping its temperature lower than the combustion point, generally referred to as "intumescent".

Additionally, some pigments chemically inhibit fire. An example is antimony trioxide in combination with halogenated organic compounds. It is thought that a reaction product, antimony oxyhalide, smothers the fire by excluding oxygen.

An important quality in the effectiveness of fire retardancy is the ability of the coating to reflect heat. In the handbook cited above (page 127) R. I. Ensminger states, "The radiation of heat from a fire to an unaffected area of the structure is a decisive factor in the spread of the fire.". Most attempts to reflect heat involve using white or pastel paints. Ensminger describes painting a combustible structure with a white or pastel paint to reflect infrared (IR) and delay the spread of fire. Titanium dioxide is a common white pigment that he suggests using. However, currently available white or pastel paints made with titanium dioxide ($TiO_2$), while highly reflective in the visible region of the spectrum, are not very reflective in the IR region, particularly at wavelengths larger than 2 micrometers ($\mu$m).

In U.S. Pat. No. 5,130,184, Harold Ellis describes a novel magnesium oxychloride fire retardant coating. One of the ingredients Ellis uses in his formulation is "standard commercial" $TiO_2$. He uses it as a whitening agent, ". . . not only decoratively, but more importantly as an IR radiant heat reflector. $TiO_2$ has great 'hiding power,' and imparts a brilliant white to the product, obviously of very low emissivity . . . and high spectral reflectance . . . in visible light, but also at IR wavelengths." (col. 15, lines 39–44). Unfortunately, the "standard commercial" $TiO_2$ does not reflect IR well. Ellis's statement that it is "obviously of very low emissivity" is unfortunately not borne out by laboratory measurements. Fire retardant qualities of Ellis's inventive coating are due to other features than IR reflection.

In the past, manufacturers of fire retardant paint appear to have assumed that paint that reflected light at visible wavelengths was also reflective in the IR region. Tests have shown however that this is not the case and that the available, highly reflective white and pale paints, containing commercially available titanium dioxide, do not reflect the IR spectrum beyond the 2 $\mu$m wavelength. It would be a great advantage if a paint could be formulated that did, in fact, reflect IR radiation.

The IR spectrum extends into the region of solar radiation, from about 0.7 $\mu$m to about 2.5 $\mu$m and another application for IR reflective coatings is to reduce the energy required to keep a building cool in hot weather. Alternately, interior IR reflective coatings can help retain internal energy and keep an interior warm. Paints used for these purposes rely on visually reflective 200 nm pigment size that fortuitously also reflects from about 0.7 to about 2.0 $\mu$m in the solar region. The important spectral region for solar IR reflectance is about 0.7 $\mu$m to about 2.5 $\mu$m; the important spectral region for IR reflectance from fire is about 1 $\mu$m to about 20 $\mu$m. The visually reflective pigments do not reflect into the region of importance for IR reflectance from fire. It would be desirable to have an additive for paints and coatings that made them reflective in the region important for IR reflectance from fire.

The military has attempted to formulate organic coatings with tailored IR reflectance for camouflage coatings. In a article entitled *Principles and formulations for organic coatings with tailored infrared properties*, in *Progress in Organic Coatings*, 20:1–25, 1992, Robert F. Brady of the Naval Research Laboratory and Lindsay V. Wake of the Australian Department of Defense, examine some of the physical properties of coatings that decrease thermal IR radiation or shift IR emission to different wavelengths. Brady and Wake describe on page 6 of their article that, "Commercial titanium dioxide pigments are manufactured with a particle size of 200 nm, the optimum value for scattering visible radiation with a peak intensity of 500 nm. As can be seen . . . , larger particle sizes will be required to scatter the longer wavelengths of IR radiation. For titanium dioxide and red iron oxide, 1-$\mu$m particles would effectively scatter near-IR radiation at 2.3 $\mu$m, . . . . To scatter thermal IR radiation, particles several micrometers in diameter would be required." In the thermal IR region the authors suggest use of metallic pigments, particularly aluminum flakes. The authors discuss use of IR reflective coatings using metal flake pigment and large diameter $TiO_2$ to reflect solar heat for structures such as a space station, or ships, and to make camouflage coatings for forest, jungle, and desert regions. It would be a great advantage if similar principles could be used to retard the spread of fire.

Progress in the development of IR reflective coatings has been impeded by lack of recognition that reflectivity for thermal IR and fire radiation can be quite low even for visibly reflective, white, coatings. For example, Ensminger in the Pigmentation Handbook and Ellis in the above cited patent refer approvingly to the use of $TiO_2$ pigments to achieve high IR reflectivity. It can be shown to the contrary however that, at wavelengths greater than 2 micrometers ($\mu$m), IR reflectivity is too small to retard fire spread.

II. SUMMARY OF THE INVENTION

It is an object of this invention to provide a fire retardant paint or coating additive that causes the coating to reflect near and thermal IR. The effect of particle size on the spectral reflectance has been calculated to show explicitly how the reflectance of fire radiation can be greatly increased by adding suitable IR reflective pigment particles to the coating. The critical dimension of these particles is optimally 5 to 10 times the conventional 200 nm pigment size conventionally used for visual opacity and color. Other IR reflective pigments include metallic flakes, for example aluminum flakes, and mica flakes coated with a material of high index of refraction, n. The IR reflective properties of the metal or coated-mica flakes is not dependent on pigment size. However, the thickness of the coating on mica flakes is chosen as a quarter wavelength of the radiation to be reflected divided by the index of refraction of the coating. The inventive fire retardant paint additive can be used as the only pigment in a paint, in combination with conventional paint pigments or used in other fire retardant, for example, intumescent paints.

III. SUMMARY DESCRIPTION OF THE DRAWINGS

FIG. 1: shows spectral reflectance computed for 100 micrometer ($\mu$m) thick layers with 0.1 volume fraction of rutile pigment, for particle diameters of 0.22 $\mu$m and 1.5 $\mu$m. The dashed curve shows the spectral distribution of 1500 K blackbody radiation which simulates emission from a fire. The decline of the 1.5 $\mu$m curve at long wavelengths is in part due to dispersion; the refractive index of $TiO_2$ declines to 2.0 at 8 $\mu$m.

Figure 2:
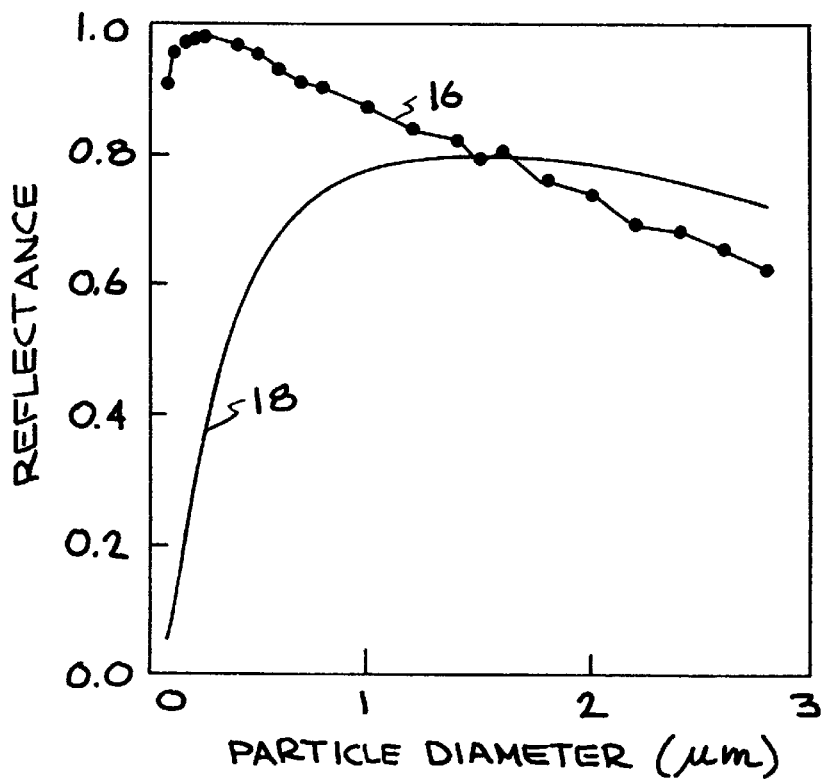

FIG. 2: shows visible and 1500 K reflectances for 100 $\mu$m layer with 0.1 volume fraction of rutile pigment, as a function of particle diameter.

Figure 3:
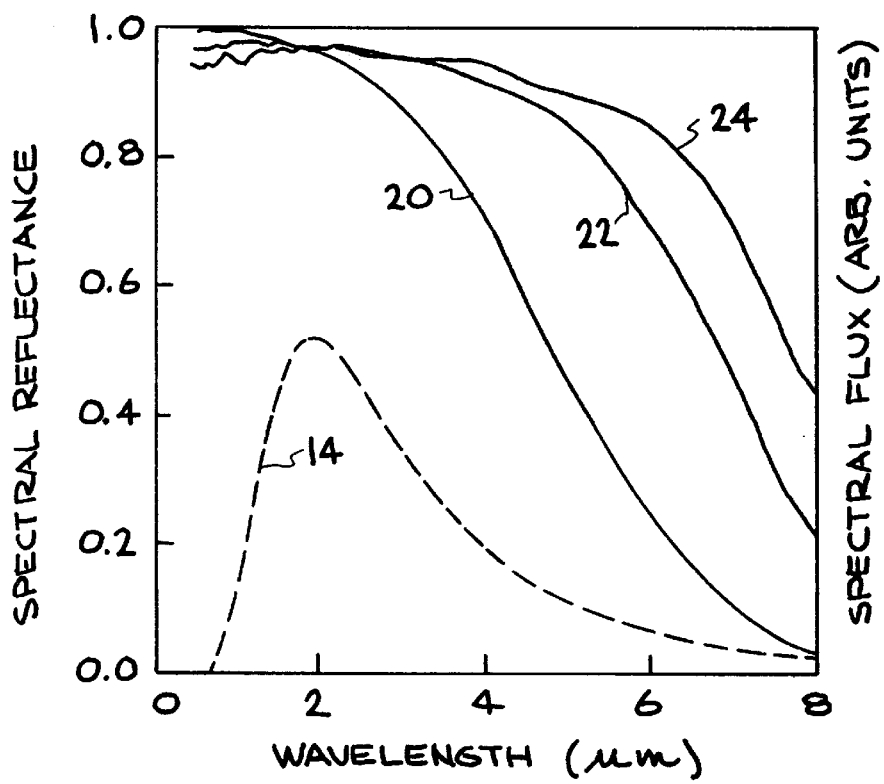

FIG. 3: shows the spectral reflectance computed for 400 $\mu$m thick layers with 0.1 volume fraction of rutile pigment, for particle diameters of 0.5, 1.0, and 1.5 $\mu$m.

Figure 4:
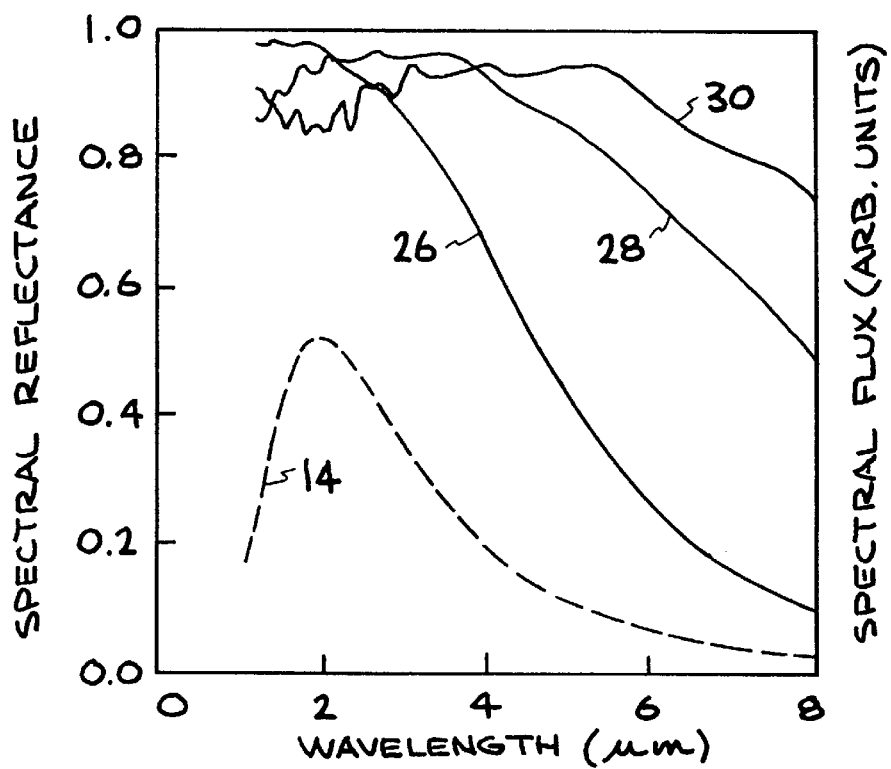

FIG. 4: shows the spectral reflectance for 100 $\mu$m thick layers with 0.1 volume fraction of silicon spheres, for particle diameters of 0.5, 1.0, and 1.5 $\mu$m. Below 1.1 $\mu$m silicon becomes absorptive (not shown).

IV. DETAILED DESCRIPTION OF THE INVENTION

The present invention comprises an additive for fire retardant coatings comprising an IR reflective pigment having at least one critical dimension between about 0.3 $\mu$m and about 50.0 $\mu$m. More preferably, the IR reflective pigment has at least one critical dimension between about 0.7 $\mu$m and about 20.0 $\mu$m. Even more preferably, the IR reflective pigment has at least one critical dimension between about 1 $\mu$m and about 4.0 $\mu$m. The invention is embodied in a fire retardant coating for painting combustible substrates comprising an IR reflective pigment, a binder component, and a solvent. Other additives which may impart various beneficial properties are generally known in the art and include uv absorbers, catalysts, surfactants, plasticizers, stabilizers, biocides, extenders, and others. Discussion of such additives is regularly found publications like *The Journal of Protective Coatings and Linings* (for example, the monthly articles by C. H. Hare, May 1992, p. 60) and in *The Paint Handbook*, Weismantel, G. E., ed., McGraw-Hill, 1981, *Raw Materials*, by E. Sihger, p. 3-1, ff.

Use of the term "IR reflective pigment" herein means solid particles that reflect electromagnetic radiation anywhere in the spectral region from about 0.7 $\mu$m to about 30 $\mu$m.

Use of the term "critical dimension" herein means the dimension of the pigment measured parallel to the direction an incident photon is traveling.

It is well known that IR radiation emitted by fire contributes to its spread. Convection is important as well, including the advection of burning embers. The relative importance of radiative heat transfer differs from fire to fire, but it is usually quite important. In the UK, minimum building separation distances are determined by consideration of the condition that the radiant flux on the building must not exceed 12 kW $m^{-2}$ if the neighboring structure is fully involved in fire. The value 12 kW $m^{-2}$ (about 12 times the radiant flux of sunlight) is used because it is an estimate of the minimum radiant flux which can cause the ignition of wood. Further evidence for the importance of IR radiative transfer comes from tests measuring the rate of fire spread along walls and floors. These measurements demonstrate that the rate increases dramatically when the burning surface is irradiated with thermal radiation.

In view of the key role played by the absorption of IR radiation by materials in the spread of fire, it is important to coat the surfaces of combustible materials such as wood, polymers, fabrics, paper, etc., with an IR reflective barrier to reduce the fire hazards associated with these materials. Under many circumstances such a coating can prevent substrate ignition despite the proximity of a heat source and, if ignition occurs, can cause a decrease in the rate of fire spread.

The advantages of an infrared coating that can reflect the infrared radiation from fire are not limited to those in which the substrate is directly combustible. For example flammable liquids are often stored in non-combustible, painted, metal containers. Painting these containers with an IR reflective coating is designed to keep the container surface cooler, and thus its flammable liquid contents cooler, when a fire is nearby. Because they may soften and fail at high temperatures, structural building members provide another example of surfaces it is desirable to protect from radiant IR emitted by fires. Thick insulating coatings are already used in some applications to protect structural steel, for example. Addition of an overcoat of the inventive IR reflective paint could enhance the performance of such insulating coatings.

The spectral range in which a fire-reflective coating needs to perform is limited. Data from a burning wooden crib show a smooth, blackbody-like spectrum with superimposed emission peaks (at 1.8, 2.8, and 4.4 $\mu$m wavelength) due to $H_2O$ and $CO_2$. In contrast, data taken from airborne observation of a forest fire show dips at the same spectral locations due to absorption (by $H_2O$ and $CO_2$) in the cool air between emission and observation. The crossover from peaks to dips should occur at path lengths on the order of 1 meter, since this is roughly the mean free path for propagation at the wavelengths of strong absorption. Soot in a fire leads to a more continuous broad band emission; that is, it obscures the emission peaks which would otherwise be observed. Considering the complexity of thermal emission from fire, it is particularly attractive to utilize a simple blackbody spectrum to represent the radiation.

The best blackbody temperature to employ depends upon the particular fire. Some researchers have suggested 1373 K as a maximum temperature a fire is likely to have. The present inventor has used the conservative figure of 1500 K as the highest temperature of an ordinary fire. Practically, gas fired radiant panels used to test flammability of materials are often operated at temperatures near 1000 K. The 12 kW $m^{-2}$ criterion mentioned above for ignition of wood translates to 650 K radiant temperature for full field of view of the radiator. Thus 650 K is a rough estimate of the minimum significant radiant temperature, although even lower radiant fluxes can contribute significantly to the rate of fire spread.

For 1500 K radiation, the important wavelength range is roughly 1 to 8 $\mu$m. This range shifts inversely with absolute temperature. For example, it is 2 to 16 μm for cooler 750 K radiation. While 1500 K radiation is visible as an orange color, it is clear that there is very little overlap with the visible spectrum. In particular, the visible appearance of a coating is not necessarily related to the reflectance for the radiation from fire.

The effect of particle size on the spectral reflectance has been calculated and shows explicitly how the reflectance of fire radiation can be greatly increased by the use of suitable IR reflective pigment particles. The critical dimension of the inventive particles, used for IR reflective pigment, are optimally 5 to 10 times the conventional 200 nm critical dimension used for visual opacity.

The shape of the pigments is modeled as spherical and dimensions referred to in most cases below refer to the diameter of the model sphere. However, in practice the IR reflective pigment may have many shapes in which case the critical dimension is the dimension of the pigment measured parallel to the direction the photon is traveling.

Numerical Model

The pigment particles were assumed to be nonabsorbing spheres which are imbedded in a transparent layer over an absorbing substrate. Thus Mie theory can be used to determine the scattering cross section of the pigment particles. The scattering cross-section is the probability that an incident photon is scattered by the particle, in this case modeled as spherical. The differential scattering cross-section [$\sigma(\theta, \phi)$] is the probability that an incident photon is scattered into a small solid angle (d$\Omega$) about coordinate angles $\theta$ and $\phi$. The numerical model was adapted from the model employed by Palmer et al. A multiple-scattering model for opacifying particles in polymer films, *J. Coatings Technol.* 61:(779) p.41. The spectral reflectivity of the coating is given by $$R = sfh/(2 + sfh), \quad (1)$$

where f is the volume fraction of the pigment in the film, h is the film thickness, and the scattering coefficient s is determined from the differential scattering cross section per unit particle volume, $\sigma(\theta,\phi)$:

$$s = \int d\Omega \, \sigma(\theta,\phi) [1 - \cos(\theta)]. \quad (2)$$

Thus s is not the simple sum over scattering angles of the differential cross section, but includes the weighting function [$1 - \cos(\theta)$]. This weighting function imposes the physically important constraint that scattering at small scattering angles does not contribute to the reflectivity R.

For purposes of computation, Eq.(2) was rewritten in the form $$s = Q_{sca} + g \, Q_{sca}, \quad (3)$$

where the first term is the total scattering cross section, $\int d\Omega \, \sigma(\theta,\phi)$, and the second term defines the asymmetry parameter g as the average of the cosine of the scattering angle. The total cross section, $Q_{sca}$, was computed using the subroutine BHMIE listed in Appendix A of the monograph by Bohren C. F. and Huffman, D. R. 1983,(*Absorption and Scattering of Light by Small Particles*, John Wiley & Sons, N.Y.), the product g $Q_{sca}$ was computed in analogous fashion from the formula in Sec. 4.5 of the same reference.

In order to check the mathematical model, the refractive index values for $TiO_2$ were taken initially from a compilation by Ribarsky, M. W., 1985, *Titanium Dioxide(Rutile)*, in *Handbook of Optical Constants of Solids*, 795, Academic Press, Orlando, and compared with the results of Palmer et al. For example, taking the average refractive index as ⅓ of that for an electric field parallel to the c-axis plus ⅔ of that for the perpendicular field, with wavelength of 546.1 nm, with refractive index of the medium of 1.0, it was possible to reproduce the scattering results for $Q_{sca}$ and g shown in FIGS. 1 and 3 of Palmer et al. Other refractive index values, also compiled by Ribarsky in the same Handbook, were used because they extend further into the infrared, to 8 μm wavelength. The mean value of the index of refraction is 2.7 in the visible, 2.5 at 3 μm, declining to 2 at 8 μm. The refractive index of the medium was taken as 1.55 to simulate a typical transparent binder.

IR Reflective Pigment

In FIG. 1, the computed spectral reflectance is shown as a function of wavelength for pigment particle diameters of 0.22 μm, optimized for visible light scattering 10; and for 1.5 μm, optimized for scattering of 1500 K blackbody radiation 12. The dashed curve shows the spectral distribution of 1500 K radiation 14. It is clear that the coating containing conventional white pigment becomes transparent at longer wavelengths, and that it therefore is ineffective for reflection of fire radiation. Physically, the particle size is much smaller than the wavelength, so that the scattering decreases in proportion to the inverse fourth power of the wavelength (Rayleigh's law). The computed spectral reflectance for the film with 0.22 μm diameter particles agrees well with the extensive measurements on $TiO_2$ pigmented films compiled by Y. S. Touloukian et al., *Thermal Radiative Properties, Coatings, Thermophysical Properties of Matter,* 9:219 IFI/Plenum (New York, 1972).

For a conventional coating the visible reflectance is about 0.98; the reflectance for 1500 K radiation is only 0.30. Furthermore, when a smaller particle size is used, or when a lower radiation temperature is employed, the reflectance is even smaller. In contrast, for wavelengths associated with fire, reflectance of a layer with optimized IR reflective pigment size is 0.80. In this example, the 1500 K absorptance is reduced by a factor of 3.5. The rate of temperature rise of a surface so coated exposed to radiant heating is commensurably reduced by this factor. The increase in IR reflectance is accompanied by a decrease in visible reflectance, from 0.98 to 0.80.

FIG. 2 shows how the visible 16 and 1500 K, 18, reflectances varied with particle size. The visible reflectance is greatest for particle sizes of about 200 nm in diameter. The 1500 K reflectance was very sensitive to particle size for small particles. The optimum particle size for high 1500 K radiation reflectance is 1 to 2 μm. The relatively broad maximum in the curve is due to the wide spectral range of the heat radiation from fire.

The 80% reflectance for fire radiation can in principle be increased further, by the use of thicker films or the use of higher IR-reflective pigment volume concentrations. FIG. 3 shows the computed results for three different particle sizes, for a film which was 4 times thicker (400 μm) and thus deposited 4 times more pigment on the surface than for the example discussed in FIG. 1. The 1500 K reflectances corresponding to these results were 0.80, 0.91, and 0.93 for particle diameters of 0.5 μm (20), 1.0 μm (22), and 1.5 μm (24), respectively. However, reflectances as high as 90% may be difficult to achieve, due to IR absorption in the binder. The dashed line shows the 1500 K black body radiation curve 14.

The shape of the pigments is modeled as spherical and dimensions referred to in most cases below refer to the diameter of the model sphere. However, in practice the IR reflective pigment may have many shapes in which case the critical dimension is the dimension parallel to the direction the photon is traveling.

$TiO_2$ pigment flocculation is a method of making large diameter pigments. In fact, the near-IR reflectance (at 2.5 $\mu$m), has been used to monitor particle flocculation, with higher IR reflectance indicative of the clumping of pigment particles.

Another IR reflective pigment of potential interest is elemental silicon, which has absorption in the visible range, but which is transparent at wavelengths beyond 1.1 $\mu$m. The refractive index is very large, namely 3.45. FIG. 4 shows the spectral reflectance of a 100 $\mu$m layer containing silicon spheres. Comparison with FIG. 1 shows that higher IR reflectance was obtained than with a similar film containing $TiO_2$. Results are shown for 0.5 $\mu$m (26), 1.0 $\mu$m (28), and 1.5 $\mu$m (30) diameter particles. Due to the higher refractive index, the optimum particle size was a bit smaller, about 0.75 to 1.5 $\mu$m. The integrated 1500 K reflectance was roughly 0.9.

Of course, any material which is transparent to IR radiation in the required spectral range and which also has a refractive index substantially different from its binder's refractive index (e.g. about 1.5) may be used as an IR reflective pigment. Examples of additional materials and their approximate refractive indices are: $Fe_2O_3$ (3.1), a red pigment, the anatase phase of $TiO_2$ (2.5), $Cr_2O_3$ (2.5), a green pigment, ZnS (2.4), $Sb_2O_3$ (2.2), $ZrO_2$ (2.1), and ZnO (2.0).

While the above mentioned materials are substantially non-absorbing in much of the infrared, they typically have optical phonon absorption which limits the longest wavelength they can reflect. Thus $TiO_2$ starts strongly absorbing at about 12 $\mu$m, $Sb_2O_3$ at about 12.5 $\mu$m, $Fe_2O_3$ at about 14 $\mu$m, $Cr_2O_3$ at greater than about 14 $\mu$m, and ZnO at about 17 $\mu$m. Elemental silicon is non-absorbing from about 1.1 to about 30 $\mu$m, because its phonon modes are not infrared active. Likewise aluminum and other metal flakes (discussed further below) are reflective throughout the infrared region.

Coatings of materials with high index of refraction, n, such as $TiO_2$ and $Fe_2O_3$, deposited on mica flakes can be employed to reflect IR radiation. Using thicker high n coatings than are needed for colored coatings will increase IR reflectivity. Techniques for computing the correct thickness to reflect a given wavelength are the same in the infrared as in the visible part of the spectrum. For example, for maximum reflectance near a wavelength $\lambda$, the coating thickness should be $\lambda/4n$. The article by L. M. Greenstein in the *Pigment Handbook* (v:1, p. 829), above, teaches these calculations. Coated synthetic fluorophlogopite micas in which IR absorbing OH groups have been largely eliminated by the use of fluorine substitution form a desirable IR reflective pigment substrate. To achieve high reflectance over a wide spectral range, more than one type of coated flake may be used.

Yet another important IR reflective pigment for use in coatings, which is not IR transparent, is aluminum metal in the form of thin flakes. Aluminum is highly reflective in the IR due to the high concentration of mobile electrons. "Leafing" aluminum paints are particularly reflective. These coatings contain overlapping pigment flakes which are parallel to and concentrated near the surface of the binder. One set of measurements showed Al paint reflectance values of 0.75 to 0.8 for the key spectral range of 1 to 8 $\mu$m.

A further type of IR reflective pigment, one which is transparent in the visual range, can be formulated based on the technology of low emittance coatings for windows. These coatings are composed of transparent semiconductors which are doped to provide a high concentration of free charge carriers. At low frequencies (i.e., in the infrared) the free carriers cause reflection, but above the plasma frequency the coating becomes transparent. The concentration of free carriers may be adjusted to provide the desired plasma frequency. Examples are $ZnO:Al$, $In_2O_3:Sn$, and $SnO_2:F$. These and similar materials can be used to coat mica flakes to produce an IR reflecting pigment. The advantage of transparency or translucency in the visual range is that the visual appearance of a surface (e.g., wood) need not be determined by the IR reflective coating.

Yet another option is the use of very thin (about 10 nm) noble metal coatings. Like the semiconductor coatings, they are transparent in the visible and reflective in the IR; These coatings can be employed in a similar way on mica flakes.

IR reflective pigments can be added to coatings that also contain conventional pigments, or, an IR reflective undercoat can be used with conventional coatings that are IR transparent but visually attractive.

IR reflective pigment in the size range of about 2 $\mu$m to about 4 $\mu$m is useful to reflect the heat associated with relatively cool smoky fires that radiate in the range of about 2 $\mu$m to about 16 $\mu$m. The upper end of the IR reflective pigment size range is not critical and can be as large as 50 $\mu$m, although that isn't necessary.

IR reflective pigment in the size range of about 1 $\mu$m to about 3 $\mu$m is useful to reflect the heat associated with relatively hot, 1000 K to 1500 K fires that radiate in the range of about 1 $\mu$m to about 8 $\mu$m. Again, the upper end of the IR reflective pigment size range is not critical and can be as large as 50 $\mu$m, although that isn't necessary. However, pigment smaller than about 0.3 $\mu$m to about 1.0 $\mu$m does not reflect IR with wavelengths greater than 2 $\mu$m and thus is not very useful for fire retardency.

The IR reflective pigments are dispersed into the coating formulation using the standard techniques in the art, as described, for example, in *Paint Flow and Pigment Dispersion* by Temple C. Patton, John Wiley & Sons (New York; 1979). The quantity of IR reflective $TiO_2$ pigment needed to form an IR reflective film is shown in FIGS. 1 and 2. They show that a 1500 K fire reflectance of 80% is achieved with a 10% volume fraction of $TiO_2$ in a 100 $\mu$m thick film. This is equivalent to using 43 grams of $TiO_2$ per square meter of substrate and is close to a minimum concentration for effectiveness. Considering that pigment dispersion will not be perfect and that the binder component will absorb somewhat in the IR region of the spectrum, a suitable range of $TiO_2$ rutile pigment quantity is about 40 to about 160 grams per square meter. Pigments with lower refractive index must be used in larger amounts, just as is the case for conventional pigments in visibly reflective white coatings.

Pigments in the form of flakes, particularly aluminum flakes, are advantageously employed in leafing coating systems. The IR reflective pigment is coated by a lubricant such as stearic acid which is not easily wet by the mixture of binder and solvent. Consequently the flakes accumulate at the surface of the film, raising the IR reflectance and reducing the penetration of IR radiation into the binder.

Effects of the Binder

The binder supporting or containing the IR reflective pigment may absorb IR radiation. Many binder materials exhibit some absorption in the 1 to 8 μm wavelength range due to vibrational modes of the molecules in the material.

Organic polymers exhibit strong absorption near 3.4 μm due to C-H stretching vibrations. The precise spectral location and width of the absorption depends on the particular polymer, but the width is often only 0.1–0.2 μm, so that the resulting 1500 K radiation absorption need not exceed a few percent. The carbonyl group (C=O) has absorption at 5.75 μm; carbon—carbon bonds are associated with absorption near 6.1 μm. In addition to this absorption at discrete wavelengths, organic polymers also exhibit a poorly understood "continuous" or background absorption which has no marked spectral structure. This absorption could be due to the continuum distribution of vibrational modes in amorphous polymer regions. As a specific example, consider a polyethylene film of 50 μm thickness with a normal spectral transmittance of about 0.78 at 5 μm wavelength. Its reflectance is 0.08, so that the absorbance is 0.14. This level of absorbance is large enough to have a significant effect on an IR reflective pigment-filled film. The background absorption in polyethylene may be due to impurities. Despite IR absorbance of the binder, overall 1500 K reflectances of about 0.8 are achievable with $TiO_2$ IR reflective pigment.

Inorganic silicate binders are advantageous in the formulation of IR reflective coatings. Silicon-oxygen bonds cause absorption near 9 μm, and other vibrational modes are not likely to be situated at shorter wavelengths if the involved atoms are heavy (e.g., K, Na, Al).

In general, objectionable absorption in the 1 to 8 μm wavelength range is likely to be due to the presence of strongly bonded light atoms, especially hydrogen, which can vibrate at sufficiently high frequencies. The vibrational frequency is inversely proportional to the square root of the atomic mass. The presence of OH groups, in either IR reflective pigments or binder, leads to broad absorption in the 2.9 μm region. The water molecule absorbs strongly at 1.4, 1.9, 2.7, 5.9, and 6.6 μm. Thus, in particular, pigments with water of hydration should be avoided.

Heat resistance is an important parameter for binder formulations in fire resistant paints. For example, silicone binders oxidize to $SiO_2$ which has a very high melting point, greater than 1610° C. Also halogenated organic resins are generally stable at higher temperatures than non-halogenated resins. Information on the heat resistance of binders and pigments may be found in an article by W. B. Maass, *Pigmentation of Heat-Resistant Paints, Pigment Handbook*, v. 2, pg. 137, P. A. Lewis, ed. (John Wiley, New York: 1988).

Suitable binders for IR reflective coatings include silicones, alkyd resins, chlorinated alkyd resins, acrylics, acrylates, alkalai silicates, polyvinyl acetates, and epoxies. Silicones and alkalai silicates have the best IR transparency but many organic resins, particularly synthetic resins, are also suitable. In compositions with many different components, IR absorption bands within the critical wavelength range may combine additively. For many additives that remain less than about 1% of the total composition of the coating, little detrimental effect is observed.

Test 1

Fire retardant properties of ordinary white coatings were examined using a standard American Society for Testing and Materials (ASTM) test (ASTM E108). A four foot square simulated sloping roof structure was exposed at the lower edge to a flame from a 4 foot long methane burner. Air flow from a blower simulated wind and caused the flame to approach the roof surface.

Two samples were tested. One was constructed of untreated cedar shake shingles. The other employed similar shingles but was painted with conventional white paint containing conventional 200 nm $TiO_2$ pigment. The white coated shingles ignited after 50 seconds of flame exposure whereas the uncoated control sample ignited after 40 seconds. These results demonstrated that the ordinary white coating exhibited little or no fire retardant effect. Despite claims in the literature of IR reflectivity for conventional white paint, in reality pigment consisting of 200 nm $TiO_2$ particles is nearly transparent to the radiation from fire.

Test 2

Three samples of untreated 1 inch×4 inch×¼ inch pine were exposed to essentially equal levels of radiative heat from red hot coals. One sample was uncoated. A second sample was coated with an ordinary visually reflective, oil-based white paint containing conventional 200 nm $TiO_2$ pigment. The third sample was coated with a commercial paint known to contain IR reflective pigment (Ace Five Star brand Chrome Finish Aluminum coating 16444).

The IR reflective paint contained aluminum pigment and was oil-based with an unknown binder that was heat resistant to 600° F. Two coats of this low viscosity paint were applied in accordance with the manufacturer's instructions. The IR reflectance of the aluminum paint was estimated to be about 70% to 80%, based partially on published measurements on aluminum paint with silicone binder (Touloukian, cited above, p. 1498).

To expose the samples to a high flux of infrared radiation, they were positioned to face the side of a charcoal fire. The long axis was vertical, with the 1 inch by 4 inch surface located one inch from and facing the red hot coals. The time lapse to ignition under these conditions was 2 minutes for the uncoated pine, 3.25 minutes for the white sample and 8.5 minutes for the IR-reflective coated sample. These results indicate that ignition is delayed by more than a factor of 2 if a flammable substrate has an IR-reflective coating. In addition, the sample coated with IR reflecting paint did not fail by bursting into flame as did the other pine samples, but began to smolder and glow, demonstrating that even after ignition combustion proceeded at a much slower pace in the sample containing IR reflective pigment.

Thus, the invention provides a paint that reflects thermal and near IR so that the spread of fire is slowed.

The description of illustrative embodiments and best modes of the present invention is not intended to limit the scope of the invention. Various modifications, alternative constructions and equivalents may be employed without departing from the true spirit and scope of the appended claims.

Having thus described the invention, what is claimed is:

1. An additive for fire retardant or heat resistant coatings comprising an IR reflective pigment having:
   a) at least one critical dimension between 1.0 μm and about 50 μm;
   b) an index of refraction throughout the critical dimension equal to or greater than about 2.

2. The IR reflective pigment of claim 1 having a critical dimension between 1.0 μm and about 20.0 μm.

3. The IR reflective pigment of claim 2 having a critical dimension between about 1 μm and about 10 μm.

4. The IR reflective pigment of claim 3 having a critical dimension between about 1 μm and about 4 μm.

5. An additive for fire retardant or heat resistant coatings comprising mica flakes encapsulated with a material having an index of refraction greater than about 2.0, the encapsulation consisting of a thickness of about $\lambda/(4n)$, where $\lambda$ is the wavelength of the IR radiation to be reflected and n is the index of refraction of the encapsulation material.

6. The additive of claim 5 wherein the encapsulation material is chosen from the group consisting of $Fe_2O_3$, $TiO_2$, $Cr_2O_3$, ZnS, $Sb_2O_3$, $ZrO_2$, and ZnO and mixture thereof.

* * * * *